J. B. GIFFEE & T. H. HOWELL.
AUTOMATIC MEASURING DEVICE.
APPLICATION FILED SEPT. 22, 1916.
1,250,847.
Patented Dec. 18, 1917.
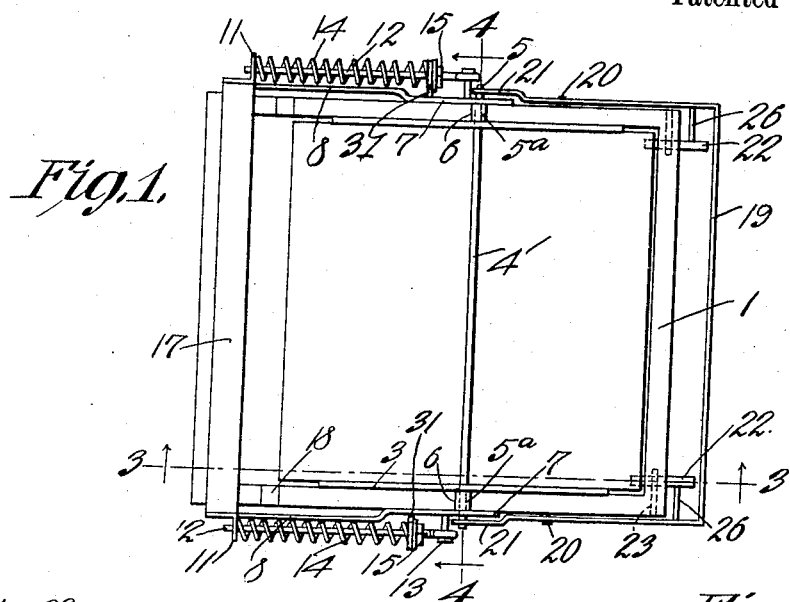
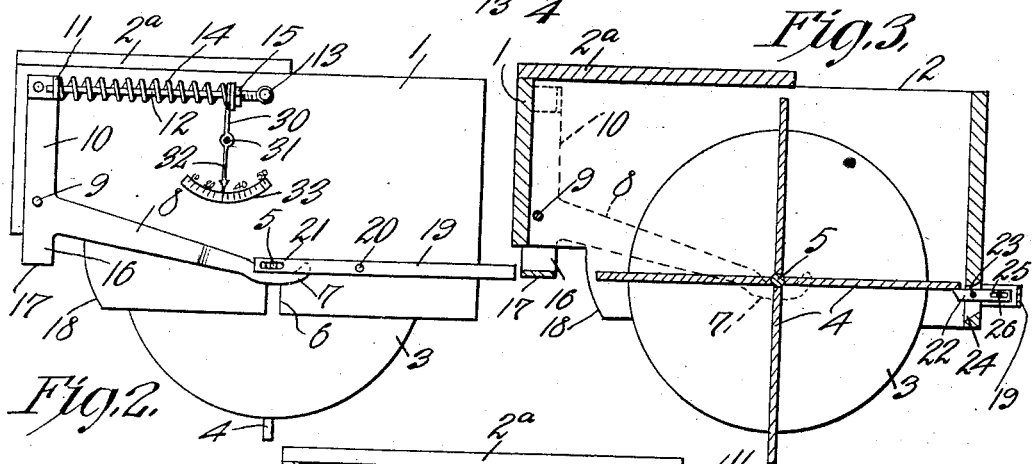
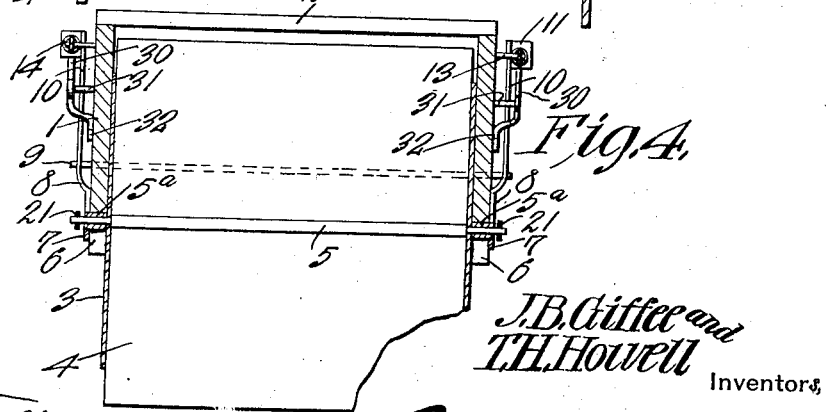
Witnesses
J. B. Giffee and
T. H. Howell
Inventors
by C. A. Snow & Co.
Attorneys

UNITED STATES PATENT OFFICE.

JOSIAH B. GIFFEE AND THOMAS H. HOWELL, OF BARNESVILLE, OHIO.

AUTOMATIC MEASURING DEVICE.

1,250,847.  Specification of Letters Patent.  Patented Dec. 18, 1917.

Application filed September 22, 1916. Serial No. 121,646.

*To all whom it may concern:*

Be it known that we, JOSIAH B. GIFFEE and THOMAS H. HOWELL, citizens of the United States, residing at Barnesville, in the county of Belmont, State of Ohio, have invented a new and useful Automatic Measuring Device, of which the following is a specification.

The present invention appertains to measuring and feeding devices, and aims to provide a novel and improved contrivance for measuring sand, lime, grain, and the like.

It is the object of the invention to provide a measuring device embodying a rotary measuring wheel having a number of buckets or chambers for successively receiving the sand or other material, whereby the wheel is rotated by the weight of the material, means being provided for normally holding the wheel against rotation while one bucket or chamber is being filled, and for releasing the wheel to allow said bucket to move downwardly for discharging the material therefrom, the succeeding bucket then held in position to receive the material. This provides for an intermittent delivery of the material in charges of a predetermined weight.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a bottom view of the measuring device.

Fig. 2 is a side elevation thereof.

Fig. 3 is a section taken on the line 3—3 of Fig. 1, and

Fig. 4 is a section taken on the line 4—4 of Fig. 1.

The frame of the device, which may be supported in any suitable manner, embodies a box or casing 1 which is bottomless, and is provided with an upper receiving opening 2 between its sides and adjacent one end, the remaining portion of the casing being covered by a top $2^a$.

Mounted for rotation within the frame 2 is a measuring wheel embodying circular ends 3 and radial wings or blades 4 between the ends, but the wheel can be constructed otherwise. The wings 4 and ends 3 are mounted upon a transverse axle or shaft 5 projecting through downwardly opening vertical slots 6 provided in the lower edges of the opposite sides of the frame. The protruding terminals of the axle 5, which provides trunnions for supporting the wheel, are preferably journaled through anti-frictional bearings $5^a$ slidable within the slots 6. The frame 1 is rectangular and is of the size desired, and the measuring wheel works snugly within the frame. The wings of the wheel provide buckets or chambers for receiving the sand or other material, and the ends 3 of the wheel reduce to a minimum the tendency for the material coming into contact with the sides of the frame. One half of the wheel is located under the top $2^a$, while the other half is located under the opening 2. The rotary measuring wheel is yieldably supported, whereby it can move downwardly when the respective bucket is filled, and to this end, the bearings $5^a$ which project outwardly from the sides of the frame 1 are seated in the curved free ends 7 of a pair of inclined arms 8 disposed at the opposite sides of the frame and pivoted to the frame. In order to pivot the upper ends of the arms 8 adjacent that end of the frame remote from the opening 2, a transverse rod 9 is engaged through the sides of the frame and is engaged to the arms 8 for pivoting or fulcruming the same to the frame. The arms 8 project downwardly and have the curved ends or seats 7 at their lower free ends projecting across the slots 6 and supporting the bearings $5^a$.

The butt or pivoted ends of the arms 8 are provided with upstanding portions 10 provided at their upper or free ends with outturned pivoted ears 11 through which rods or stems 12 are slidable. The rods 12 are pivoted, as at 13, to the sides of the frame above the axle 5 and the free ends of the arms 8. Coiled wire expansion springs 14 are disposed upon the rods 12 between the ears 11 and the nuts 15 threaded upon the rods 12, whereby the springs 14 swing the portions 10 to raise the arms 8. The axle 5 is thus normally lifted within the slots 6 to raise the measuring wheel, and when the measuring wheel moves downwardly under the weight of the material held thereby, the arms 8 are depressed, causing the portions 10 to swing toward the pivots of the rods 12 for bringing the springs 14 under greater compression. The springs 14 normally resist the downward movement of the measuring wheel, and the tension of the springs 14 is regulated properly by adjusting the nuts 15, whereby the gravitation of the measuring wheel is controlled accordingly.

The butt or pivoted ends of the arms 8 have depending portions 16, and a transverse strip or yoke 17 is terminally secured to the portions 16 below the pivots of the arms 8, the respective lower corners of the sides of the frame 1 being cut away, as at 18, to accommodate the strip 17.

A detent device is provided for preventing the rotation of the measuring wheel until the respective bucket or pocket of the wheel is filled with material of a predetermined weight, in which event the wheel is released in order that it can turn for discharging the material. For this purpose, a U-shaped lever 19 disposed substantially horizontal to straddle the frame 1 with its yoke portion remote from the arms 8, and the limbs of the lever 19 are fulcrumed upon outstanding pivots 20 carried by the sides of the frame. The terminals of the lever 19 or one double arm of said lever are provided with slots 21 slidably engaging the terminals of the axle 5, whereby the depression of the measuring wheel and its axle will depress the terminals of the lever 18 to raise the yoke portions thereof. A pair of detents 22 are pivoted between their ends, as at 23, within slots 24 provided in the front wall of the frame 1, and the inner ends of the detent project from said wall in the path of the free edges of the wings 4, so that one wing normally seats upon the inner end of the detents. The outer end portions or arms of the detents are provided with slots 25 receiving fingers 26 projecting inwardly from the limbs of the lever 19 adjacent the yoke portion thereof, whereby when said yoke portion of the lever is raised by the depression of the axle 5, the outer ends of the detent 22 will be raised likewise, to swing the inner ends of the detents downwardly away from the path of the free edges of the wings 4 to allow the measuring wheel to rotate. The lever 19 and detents are disposed in substantially the same horizontal plane as the axle 5, and it will also be noted that when the axle 5 is depressed, the wing 4 which rests upon the detents 22 will be drawn away from said detents, to assist in the liberation of the wheel in connection with the movement of the detents to releasing position.

In operation, the sand, lime, or other material to be measured, is delivered through the opening 2 from a chute, pipe, hopper, or the like, in a continuous stream. Ordinarily, when the measuring wheel is empty, one wing 4 bears upon the detents 22, and this holds said wing below the opening 2 to receive and support the material in the corresponding bucket or chamber of the wheel. The axle 5 being held in raised position by the influence of the springs 14, will be gradually depressed with the wheel as the bucket becomes filled, and when a predetermined amount of the material is received by said bucket, the wheel will be moved downwardly to such an extent, that the wing 4 which bears upon the detents 22 is released, due to the conjoint withdrawal of the wing from the detent, and the releasing of the detents by the swinging movement of the lever 19 due to the depression of the axle. The measuring wheel is thus allowed to turn one step, so that the material is discharged from the bucket, and the material gravitates downwardly and may be caught in any suitable receptacle for that purpose. As soon as the material is discharged, the measuring wheel having been advanced one step, the measuring wheel is again raised by the springs 14, whereby the detents are returned to operative position to stop and support the next succeeding wing 4 for a new operation. It is evident that the springs 14 in bearing against the upstanding portions 10 will raise the arms 8 for yieldably supporting the measuring wheel, and the tension of the springs 14 controls the operation of the measuring wheel. The tension of the springs is controlled by adjusting the nuts 15.

The present device provides for an intermittent delivery of the material in charges of predetermined weight, and any suitable register may be used for recording the amount of material discharged. The operation is entirely automatic, and the material can be delivered in a continuous stream to the device, and will be discharged in intermittent charges which can be caught individually.

As means for indicating the weight of the material necessary to turn the wheel and dump the bucket containing the material, levers 30 are pivoted, as at 31, to the sides of the frame and have their upper arms provided with loops or other means disposed between the springs 14 and adjusting nuts 15. The lower arms of the levers 30 have pointers 32 coöperating with suitably graduated scales 33 upon the sides of the frame. When the nuts 15 are adjusted, this adjusts the pointers 32 to indicate the tension of the springs 14 upon the scales 33, and in this manner, the mechanism can be adjusted to regulate the weight of the charges of the buckets.

Having thus described the invention, what is claimed as new is:

1. A measuring device including a rotatable yieldably-supported measuring wheel having buckets, and detent means coöperable with the wheel for preventing the rotation thereof when it is raised and operated when the wheel is lowered to move away from and release said wheel.

2. A measuring device including a rotatable measuring wheel having buckets and an axle, pivotally mounted arms having means at their free ends supporting said axle, spring means coöperable with said arms for yieldably holding the free ends thereof raised, and detent means engageable with said wheel when the wheel is raised, for holding said wheel against rotation, said detent means moving away from the wheel when the wheel is lowered to allow the wheel to rotate one step.

3. A measuring device embodying a frame having an upper opening and vertical slots in its sides, a rotatable measuring wheel within the frame having buckets and an axle working in said slots, arms pivoted to the sides of the frame and having portions at their free ends for supporting said axle, spring means coöperating with said arms for holding the free ends thereof raised, and detent means operatively connected to the wheel normally engaging the wheel when the wheel is raised, to prevent the rotation of the wheel, the detent means moving away from the wheel when the wheel is lowered to allow the wheel to rotate one step.

4. A measuring device including a rotatable yieldably-supported measuring wheel, and detent means engageable with the wheel to prevent the rotation thereof when it is raised, said detent means being operatively connected to the wheel whereby the detent means is moved away from the wheel when the wheel is depressed, the wheel also withdrawing from the detent means when the wheel is depressed.

5. A measuring device embodying a yieldably-supported rotatable measuring wheel having buckets, a detent engageable with the wheel to normally prevent the rotation thereof, and an operative connection between the detent and wheel whereby the depression of the wheel moves the detent away from the wheel to release it.

6. A measuring device including a rotatable yieldable-supported measuring wheel having buckets and an axle, a detent normally engageable with the wheel for preventing the rotation thereof when it is raised, means operatively connected with said axle and detent for removing the detent from the wheel when said axle is depressed, the wheel being withdrawn from the detent when said axle is depressed.

7. A measuring device including a rotatable measuring wheel having wings and an axle, means for yieldably supporting said axle, a pivotally supported detent against which said wings are seatable to normally prevent the rotation of the wheel, and means operated by the depression of said axle for swinging said detent away from the wheel.

8. A measuring device including a frame having vertical slots, a rotatable measuring wheel within the frame having wings and an axle extending within said slots, means carried by the frame yieldably supporting said axle, a detent pivoted to the frame against which said wings are seatable to normally prevent the rotation of said wheel, and a lever fulcrumed to the frame and connected to said detent and axle whereby the depression of the axle swings the detent away from the wheel.

In testimony that we claim the foregoing as our own, we have hereto affixed our signatures in the presence of two witnesses.

JOSIAH B. GIFFEE.
THOMAS H. HOWELL.

Witnesses:
H. H. MURPHY,
J. W. WHITE.